United States Patent [19]

Jensen et al.

[11] 3,905,034

[45] Sept. 9, 1975

[54] RADAR SYSTEM

[75] Inventors: Garold K. Jensen, Pinecrest, Va.;
James E. McGeogh, Silver Spring, Md.

[73] Assignee: The United States of America as represented by the Secretary of the Navy, Washington, D.C.

[22] Filed: May 31, 1963

[21] Appl. No.: 285,555

[52] U.S. Cl. .............................. 343/9; 343/100 CL
[51] Int. Cl.² .......................................... G01S 9/44
[58] Field of Search ............... 343/5, 7.7, 8, 9, 17.1, 343/100.7, 5 R, 100 CL, 17.1 R; 235/181

[56] References Cited
UNITED STATES PATENTS
| | | | |
|---|---|---|---|
| 3,044,045 | 1/1958 | Kemp | 343/17.1 |
| 3,063,040 | 11/1962 | Drukey | 343/17.1 |

*Primary Examiner*—Maynard R. Wilbur
*Assistant Examiner*—G. E. Montone
*Attorney, Agent, or Firm*—R. S. Sciascia; Arthur L. Branning

EXEMPLARY CLAIM

1. A radar system comprising:
   transmitter means for emitting signals;
   receiver means for receiving echo signals of said emitted signals which have been reflected by distant objects and for providing output doppler signals related in frequency to the movement of distant objects;
   storage means connected to said receiver means for storing and grouping said receiver output signals in a manner related to predetermined ranges of distant objects and for playing back said range grouped stored signals in a predetermined sequence and with reduced time spacing therebetween;
   oscillator means for producing a signal which rapidly varies in frequency in a manner related to the expected movement of a distant object and varies in frequency at a slower rate to be related in sequence to different range rates of the distant object;
   heterodyning means connected to said storage means and to said oscillator means
   whereby substantially constant frequency heterodyning means output signals are derived when said oscillator means frequency variations match the frequency variations in said doppler signals.

4 Claims, 7 Drawing Figures

RADAR SYSTEM

The invention described herein may be manufactured and used by or for the Government of the United States of America for governmental purposes without the payment of any royalties thereon or therefor.

This invention relates to object detecting systems in general and in particular to devices of the class identified as radar. In further particularity, it relates to correlating systems wherein short duration pulse echo signals occuring over a period of time are stored, in a manner related to the range of the target, and reproduced with a minimum of time spacing. Thus the equivalent of a long duration signal is achieved, such signal being in a form which can be filtered by narrow band circuitry to improve the signal to noise ratio and, by the well known doppler relationship, being related to the relative velocity of the target with respect to the radar system.

Many radar installations, broadly based on the above concepts, were constructed at great expense. In these previous systems, the design of the signal storage and display systems was related, in terms of ranges and the narrow band doppler frequency filtering channels, to anticipated targets of that period that is, to manned aircraft having velocities and accelerations which are small when compared to the performing parameters of present day missile targets.

When used to detect high speed, high acceleration missile targets, the previous radar systems are not capable of the optimum desired performance. One of the principal reasons for this that the large missile accelerations cause the doppler signal to quickly change in frequency, or more precisely, because the reflected signal is diluted below the retrievable level by reason of the doppler signal being processed through many narrow band channels rather than through the single, or very few, narrow band channels as occurs with targets of low acceleration.

It is the purpose of the present invention, as well as that disclosed in copending application of Garold K. Jensen, Ser. No. 53,312, filed 31 Aug. 1960, for "OBJECT LOCATOR SYSTEM," to extend the capabilities of previous radar systems so that these systems will satisfactorily detect swiftly accelerating targets such as missiles. This is accomplished by matching the movement characteristics of the missile with an internally generated heterodyning function which causes the doppler signal to remain within a single narrow band analysis channel.

It is accordingly an object of the present invention to provide an improved method of compensation of a cross-correlation radar system for objects with high acceleration.

Another object of the present invention is to provide a cross correlation radar system capable of effective detection of rapidly accelerating objects at long range.

Other and further objects of the present invention will be readily appreciated as the same becomes better understood by reference to the following detailed description when considered in connection with the accompanying drawings wherein:

Figure 1:
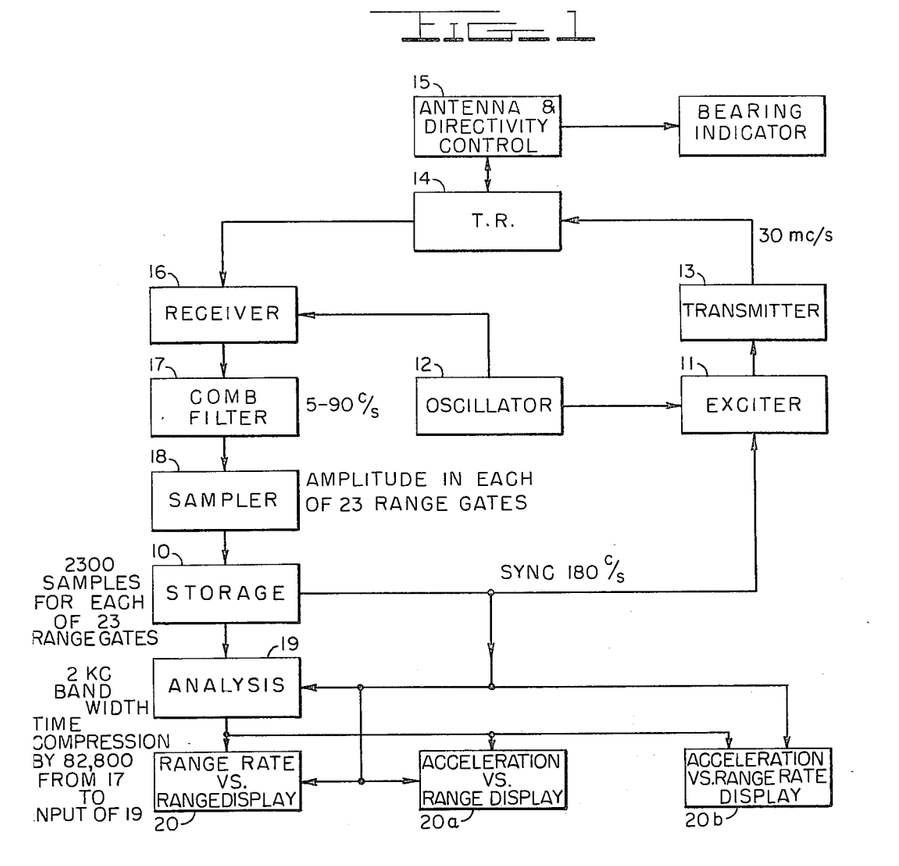
FIG. 1 shows a basic cross-correlation radar system.

The present invention is an improvement over the invention of the previously mentioned copending application. The improvement resides primarily in the production and utilization of acceleration compensation signals to provide increased accuracy in the generation of the signals. The basic overall system utilizing the apparatus of the present invention is somewhat similar to that of the prior application, differing as to certain sweep frequencies and the like. The actual novel apparatus of this application is associated with the generation and application of the acceleration compensation signals and is considerably more complex than that of the prior application but providing improved operation.

with reference now to FIG. 1 of the drawing, which is somewhat similar to the figure bearing the same number in the prior application, the apparatus shown therein indicates in general a basic arrangement of a cross-correlation radar system providing an overall system gain of approximately 33 db over conventional direct display radar systems. This tremendous increase in sensitivity is obtained by storing the signals received from selected ranges responsive to a plurality of successive transmitted signals and playing back all signals stored for a particular range in rapid sequence. The present invention is not directed to providing an increase in the maximum 33 db gain, which was possible in the above-identified system, but rather, to making this increase realizable with targets having certain characteristics where it cannot be otherwise obtained.

The overall system is a phase coherent pulse doppler system with the added sophistication of a special form of pulse sampling technique, magnetic drum signal storage, and cross-correlation. The heart of the device is the storage device 10, which in addition to its many other functions, controls several timing signals, one being at the frequency of 180 cycles per second, another at the frequency of 4140 cycles per second, and a third at the frequency of 0.5625 cycles per second. These signals may be obtained from synchronizing tracks carried by the storage device, particularly as to the 180 cycle per second signal and the 4140 cycle per second signal, however, it would normally be more desirable to derive the 0.5625 cycle per second signal from the 180 c.p.s. signal by some frequency division scheme such as with mechanical reduction or an electronic frequency division system.

The 180 cycle per second synchronizing signal is applied to an exciter 11 which is a form of gated amplifier. It receives basic RF signals from an oscillator 12 and applies them, with or without frequency manipulation as desired but in the form of pulses or radio frequency signals, to the transmitter 13 for the production of high frequency energy impulses of high power. This energy is delivered through the transmit-receive switching device 14 to antenna 15 which has suitable directivity characteristics for the particular type of operation desired. Echo signals intercepted by antenna 15 are applied through the transmit-receive switching device 14 to receiver 16. Receiver 16 also receives as basic local oscillator signals the signal from oscillator 12. The output of the receiver 16, which, as a result of the correlation processes in the receiver, contains the doppler frequency both identically and in additive combination with the fundamental and harmonics of the pulse repetition frequency (prf) of 180 cycles. The output of the receiver 16 is applied to a comb filter 17 which has an upper limit of 2 kilocycles. Below the upper limit, frequencies in the range of 0 to 5 cycles, both identically and in additive combination with the fundamental and harmonics of 180 cycles, are suppressed to avoid the backscatter signal from the earth. Similarly, below the upper limit of the filter 17, frequencies in the range of 90 to 180 cycles, both identically and in additive combination with the fundamental and harmonics of 180 cycles, are suppressed to avoid ambiguities inherent in this type of radar. The filter 17 passes the doppler signals in the frequency range of 5 to 90 cycles, both identically and in additive combination with the fundamental and harmonics of 180 cycles, the additive components being retained to obtain maximum radar system sensitivity.

The doppler signal, after it is separated from the back scatter, is applied to the sampler 18. The sampler 18 is a combination of more or less conventional circuits capable of separating on a sequential time basis the portions of the doppler signal corresponding to a plurality (typically 23) of range gates occurring during the space between successive pulses. This sampling occurs with very narrow sampling pulses. Thus the output of the sampler normally consists of the typified 23 pulses of short duration occurring in the time interval following each transmitted pulse. 23 range gates are employed to divide the total sweep period 5555 microseconds into gates equal in length to the 240 microsecond pulse width (20 miles). The sampler pulse is approximately 0.07 microsecond duration.

The 23 signals in the output of the sample 18 are then stored by storage device 10. Storage device 10, in addition to containing the timing signals at 180 cycles per second and at 4140 cycles per second, provides a storage of each of the sampled signals for the 23 range gates for 3600 successive transmitter pulses. Storage device 10 is typically a rotatable drum or disc employing magnetic storage techniques and is divided into approximately 23 portions or tracks corresponding to the range gates. Each of the 23 portions provides for storing 3600 pulses of 0.07 microsecond duration with a slight amount of overlap. The drum in its rotation and in response to the signals from the sampler 18 produces side by side storage of the signal samples for each range gate. At the end of a 20 second period, 3600 samples will have been placed side by side in each of the 23 range gates of the drum. At this point the storage drum is filled and from then on the oldest information is erased as the new information responsive to later received signals is recorded in its place.

Readout of the 3600 samples stored in the 23 range gates is accomplished in one revolution of the drum of storage device 10 or 1/180 of a second. This results in a compression of time by a factor of 82,800 which permits the analysis of all range and range rate gates in no more than the 20 seconds required to fill the storage.

Because of the time compression, the original doppler frequencies of 5 to 90 cycles per second are multiplied to 0.4 to 7.5 megacycles per second. The receiver signal bandwidth of 2 kilocycles is, in effect, multiplied by this same ratio. Thus, if a storage output signal bandwidth of 2 kilocycles per second were also used, which it is, as determined by the analysis circuits 19 which include 2 kilocycles per second filtration, the equivalent narrow banding would be equal to this ratio. In terms of the original signal bandwidth the effective output bandwidth is 1/20th of a cycle per second which allows the recovery of signals buried many db below the noise level. Typically these can be signals which can be detected even though they are as much as the previously exemplified 33 db below the noise level.

Figure 2:
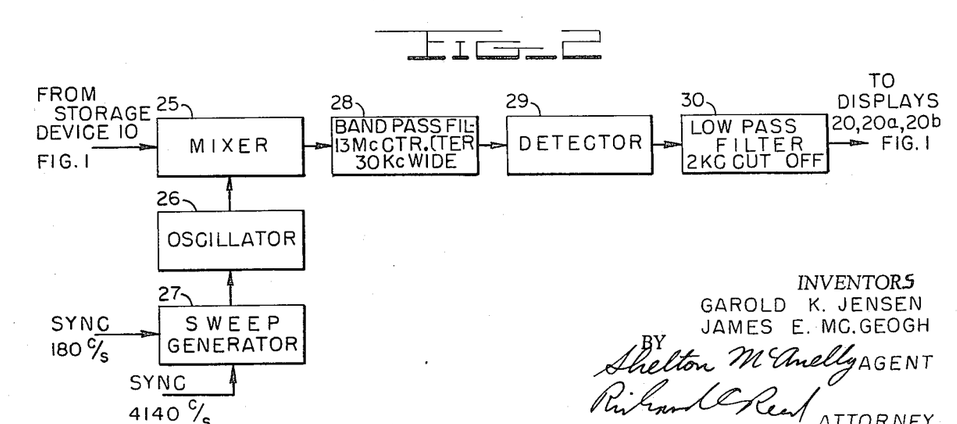
FIG. 2 shows details of the analysis apparatus 19 of FIG. 1, with the addition of a 4140 cycle per second synchronizing signal.

The analysis device 19, although shown in greater detail as to certain aspects thereof in FIG. 2, is in effect a narrow band filter having the previously typified bandwidth of 2 kilocycles per second. The frequency can be swept over the 0.4 to 7.5 megacycle per second output of the storage device 10 at a rate of 1 bandwidth of the analysis device per revolution of the drum of storage device 10. All 23 range gates are examined for signals for a particular doppler frequency or range rate for a given drum revolution. On successive drum revolutions all range gates are likewise examined for each successively higher range rate. To accomplish this in actual practice the filter itself is not tuned over the doppler band, which would be a difficult operation indeed, but an equivalent result is obtained by heterodyning the signal with a signal from a variable local oscillator as contained in FIG. 2 which will be described later. The output of the analysis circuit 19 is applied to the display devices 20, 20-a and 20-b to produce an intensity modulation on two coordinate displays with range rate forming the ordinate axis and range the abscissa for 20, acceleration and range being the coordinates for 20-a, acceleration and range rate being the coordinates for 20-b. With a 2 kilocycle per second filter bandwidth of the analysis device 19, and a total of 0.4 to 7.5 megacycle range, 3500 range rate gates would be required in sweeping out the doppler band. This sweeping would take approximately 20 seconds to complete at a drum speed of 180 revolutions per second.

This 20 second sweep requirement is considered excessive and is reduced to a period of slightly less than 2 seconds by broadening the predetection bandwidth to 30 kilocycles per second while maintaining the output post detection bandwidth at 2 kilocycles per second. This has the disadvantage of reducing the range rate resolution because the target signals in a range rate gate now are only required to remain confined to a 30 kilocycle bandwidth instead of the 2 kilocycle bandwidth previously discussed, however, it does reduce the quantity of range rate gates required for complete coverage. Typically, a total of 320 range rate gates or increments are utilized.

The 30 kilocycle channel provides a 5 knot resolution which means that the range rate of the target cannot vary more than this amount in the 20 second period required to fill the storage drum, otherwise a loss in signal sensitivity will occur. This particular range rate is quite useful for slow moving aircraft, however, it is unduly limiting where objects capable of fast accelerations such as ballistic missiles are involved. The 5 knot range rate for 20 second storage corresponds to approximately 0.4 feet per second per second acceleration, while it is not unusual to encounter a radial acceleration of 100 feet per second per second with ballistic missiles. This situation will cause the doppler frequency to sweep over more than 200 range rate gates, on an average, thus dividing the signal energy by a like ratio which results in a loss of approximately 23 db in signal sensitivity. The device of the present invention seeks to minimize such loss. In brief, it may be described as apparatus for maintaining the doppler signals in the 30 kilocycle bandwidth of the predetection filter despite the large doppler frequency shifts experienced due to the high rate of acceleration of the missile. A general description of the operation of the improvement of the present invention is the modulation of the local oscillator signal frequency for the analysis channel with a time varying function which is the same as the time variation of the signal from the drum storage so as to effect a cancellation of the variation. When a match is obtained the resultant signal will remain in a single analysis filter for the full time, that is, 240 microseconds on readout, the width of 1 range gate, and the full amplitude output signal will be available for display.

An added difficulty is that all missiles do not have the same acceleration characteristics. Multistage missiles, for example, are entirely different from single stage missiles. Thus means must be provided for accommodating and comparing a plurality of different acceleration variation patterns against the reproduced stored signals, so that eventually an acceptable match will be found which will result in a substantial amplitude signal buildup in a individual analysis filter. These functions and the periodic use and comparison thereof with return signals will effectively establish a series of acceleration gates. This basic multiple comparison was an important portion of the above-identified application.

With reference now to FIG. 2, details of the analysis apparatus 19 of FIG. 1 are shown. This Figure is primarily that of the prior system, however, for the present invention it is modified within the components 26 and 27. Additionally a 4140 cycle per second synchronizing signal is shown. The output from the storage device containing signals in the region of 0.4 to 7.5 megacycles per second is delivered to a mixer 25. Mixer 25 also receives a signal which is swept in frequency from 13.4 to 20.5 megacycles per second as obtained from oscillator 26. In the improvement of the present invention the frequency sweep is by a complex sweep signal having two basic frequency variations occurring simultaneously. The first is a range rate sweep at a frequency of 0.5625 cycles per second, which frequency is obtained by dividing 4140 cycles per second by 23 for that number of range gates and in turn by 320 for that number of range rate steps. The second variation of the frequency from oscillator 26 is at a frequency of 4140 cycles per second over a range of approximately 4.5 megacycles. The 4.5 megacycle fast sweep must be of the same magnitude at the low frequency end of the slow speed sweep as at the high frequency end of the slow speed sweep. The overall frequency deviation from 13.4 to 20.5 megacycles per second is in excess of 7 megacycles per second which represents nearly 50% of the low frequency of 13.4 megacycles per second. The derivation of signals having such frequency ranges by conventional prior art methods is considered to be impossible. The present invention with its complex variational scheme avoids the spectrum arrangemet of FIG. 3 of the system of the prior application.

Control of the frequency of oscillator 26 is accomplished by sweep generator 27 which is synchronized to the 180 and 4140 cycle per second signals obtained from the storage device 10 to produce the sweeps having the characteristic described in the foregoing.

Mixer 25 is connected to a predetection bandpass filter 28 which has bandpass characteristics such that a band 30 kilocycles wide with a center frequency of 13 megacycles per second is obtained. Filter 28 is connected to detector 29 by means of which the envelope of the output of the bandpass filter 28 is derived. Detector 29 is connected to a lowpass filter 30 having a 2 kilocycle per second cutoff frequency and constituting the post detection filtration. The output signal from lowpass filter 30 is delivered to the display devices 20, 20-a, 20-b.

Figure 3:
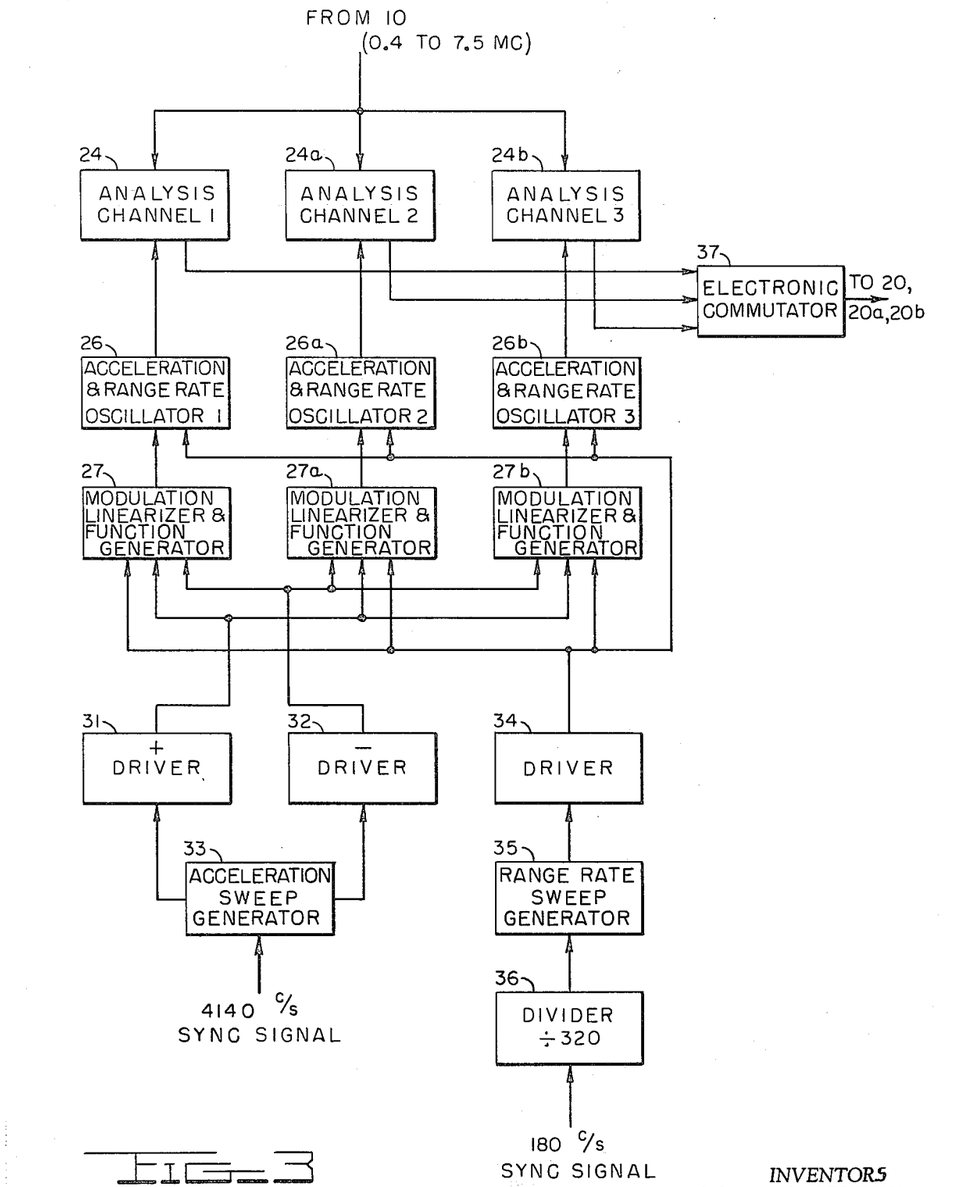
FIG. 3 shows the manner of paralleling of analysis channels in accordance with the present invention to accommodate comparison of a plurality of acceleration variation characteristics.

With reference now to FIG. 3 of the drawing, the apparatus shown therein indicates the general manner of paralleling of the analysis channels of FIG. 2 to compensate for three different missile acceleration characteristics. The three analysis channels, 24, 24a, and 24b, are driven by three acceleration and range rate oscillators, 26, 26a, 26b, under control of the three modulation linearizers and function generators, 27, 27a, and 27b. To the modulation linearizers and function generators are applied the 4140 cycle per second signal from drivers 31 and 32 and the 0.5625 cycle per second signal from divider 36. The 0.5625 cycle per second signal also provides the range rate modulation of the oscillators 26, 26-a and 26-b.

Outputs from the three analysis channels, 24, 24a, and 24b are applied to the electronic commutator 37 which places the outputs from the various analysis channels in sequence in a single line for delivery to the display devices.

Figure 4:
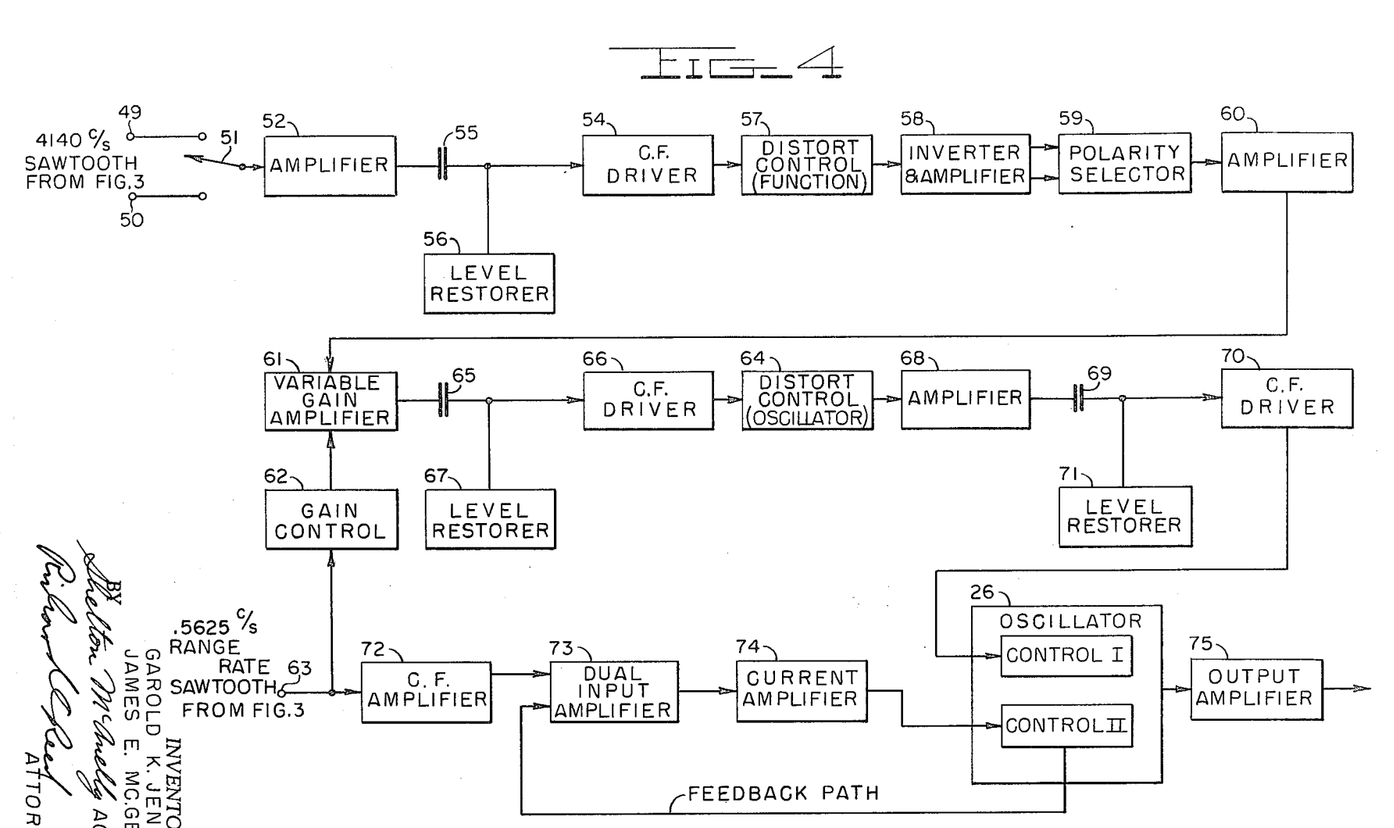
FIG. 4 is a block diagram of improved acceleration and range rate oscillator and linearizer apparatus.

With reference now to FIG. 4 of the drawing, a basic block diagram of the improved acceleration and range rate oscillator 26 and the modulation linearizer and function generator 27 forming the basis of the present invention, is shown. It is observed that each analysis channel requires an acceleration and range rate modulated oscillator 26 and a modulation linearizer and function generator 27 and that in keeping with the preceding discussion, a total of 320 such channels is required to provide sufficient acceleration pattern variation for complete coverage, however a lesser quantity can provide effective action for selected missiles. The output from the acceleration sweep generator 33 of FIG. 3 is obtained from drivers 31 and 32 at terminals 49 and 50 of FIG. 4 as either a negative or a positive going sawtooth as desired for the operation of the circuit, selection being made by a switch 51.

Likewise, range rate sweep generator 35 of FIG. 3 provides a highly linear sawtooth wave for general utility by the various modulation linearizers and function generator 27. The negative or positive going sawtooth wave signal selected by switch 51 of FIG. 4 is applied to input amplifier 52 of that figure. Amplifier 52 is ac coupled to a cathode follower driver stage 54 by virtue of capacitance 55 together with level restorer 56. The driver 54 is connected to the distort control 57, the purpose of which is to perform a desired alteration or "distortion" of the sawtooth wave output of driver 54. This alteration can be of many desired forms depending upon the particular characteristics of the distort control. In any event, the distortion is such as to match insofar as is possible, the acceleration characteristics of a distant object to form the basis for frequency variation of a local oscillator to match the doppler frequency changes caused by the acceleration of the object. Where either a linear acceleration condition exists or where there is a low acceleration variation, such as with airplanes, a complex variation of the sawtooth is not necessary and the distort control can then be set to provide merely a gain factor alteration of the applied sawtooth signal. Typical details of the distort control are shown and described in considerable detail in connection with a subsequent figure, where the various matters of producing the desired acceleration compensation are discussed. In this connection, it is appropriate to mention that the input polarity control switch 51 provides for a selection of a positive or a negative-going sawtooth for compensation for objects which are accelerating such as to be either approaching or receding from the locator system and for other purposes where one polarity or the other of acceleration variation is desired. Signals which are distorted by the distort control 57 are applied to an inverter and amplifier 58 by means of which polarity selection of the post-distortion polarity selection is also provided.

Thus it is possible to select the polarity of distorted signals with polarity selector 59 to achieve particularly desired matching conditions. The reason for the plural polarity selection arrangement is that the distort control 57 normally performs its distortion on the basis of voltage levels, that is, a different distortion if produced during low levels of the input sawtooth signals than during high levels of such signals, for example. This would match, for example, a missile which might have initially high acceleration characteristics which would level off at a later time. Such characteristics, of course, are not universal because there are missiles which may experience faster accelerations during later portions of their flights than during the earlier portions due to the use of multiple stages. Since the distortion control 57 operates on a level basis it is desirable then to provide an input sawtooth to amplifier 53 which is negative or positive going, depending upon which form of distortion is desired, and to also provide a compensating polarity selection at the polarity selector 59 to drive the succeeding stages with signals of the desired utimate polarity.

Output signals from the polarity selector 59 are applied to amplifier 60 and then to a variable gain amplifier 61. Variable gain amplifier 61 has its gain adjusted by gain control 62 which is connected to the input 0.5625 cycle per second range rate sawtooth signal terminal 63, which signal is delivered from driver 34 of previously described FIG. 3. Basically the signal from amplifier 60 is the acceleration sweep signal intended to drive the local oscillator over a range of frequencies corresponding to those which the incoming doppler signal is varied due to the acceleration of the target. As will be described subsequently, the frequency of the local oscillator is also changed to cover a range of variation of the range rate of a target, and in the resulting circuitry it has been found that a particular amplitude variation of the signal output from aplifier 60 has different effect upon the range of variation of the frequency of the local oscillator, depending upon the particular value of the range rate variation signal applied to the local oscillator at any one instant. To compensate for this variation the amplifier 61 of variable gain is inserted to change the amplitude of the acceleration sweep signal from amplifier 60 delivered through subsequently described circuits to the local oscillator in dependency upon the range rate signal.

Gain controlled output signals from amplifier 61 are applied to a second distort control 64 through capacitance 65 and cathode follower driver 66. DC restoration for voltage reference purposes at the input to cathode follower driver 66 is provided by level restorer 67.

In the local oscillator 26, which is repeated in FIG. 4, bearing the same previously used reference character, two frequency variation schemes are employed. A first form of variation is a low speed slow rate variation which is repetitive at the frequency of 0.5625 cycles per second to provide the range rate sweep. This particular sweep is of such a low repetitive frequency as to provide no particularly great degree of difficulty in itself, however, when it is coupled with the second form of variation at the repetition rate of 4140 cycles per second, particularly difficult overall frequency variation problems result. To begin with, the range of frequency variation by both means is quite large, being of the order of 50% of the low frequency extreme. Conventional electronic frequency variation schemes such as reactance tubes are limited to approximately a 10% range of frequency variation, and hence, are inadequate by a factor of 5 for the present requirements. Accordingly, a basic high frequency variation scheme, indicated as control 1 in the oscillator 26, is employed, which is based upon the variable capacitance properties of a back biased semiconductor diode. In the circuitry to be described, the capacity variation of the semiconductor diode is such as to permit a frequency variation of 4.5 megacycles per second from the low limit of 13.4 megacycles per second and this 4.5 megacycle sweep is maintained through the range of the range rate sweep at 0.5625 cycles per second to reach an ultimate of 20.5 megacycles per second, still maintaining the basic 4.5 megacycle sweep at a frequency of 4140 cycles per second.

The variable capacitance semiconductor diode of control 1 of oscillator 26 has certain properties of its own which must be considered and accomodated to provide the overall desired result. In the first place, a linear frequency sweep at 4140 cycles per second is required, however, the oscillator 26 does not experience a linear frequency change upon the application of a linear voltage variation to the semiconductor diode. A deliberate alteration or "distortion" of the linear sawtooth which would represent uniform acceleration of a distant target is desired to cause the oscillator to experience a uniform rate and range of frequency change due to the acceleration sweep signal at 4140 cycles per second. This purposeful distortion is brought about by the distort control 64 which is similar in makeup and function to the previously described distort control 57. The distort control 64 is connected through amplifier 68, capacitance 69, cathode follower driver 70, to control 1 of oscillator 26. A dc level restorer 71 is employed to maintain the reference voltage levels for precise control of frequency variations. In practice, the distort control 64 is adjusted to where an input linear sawtooth from driver 66 is distorted in such a manner as to achieve a linear and uniform magnitude variation of frequency with time at the repetition rate of 4140 cycles per second with the oscillator 26. The makeup of typical oscillator 26 will be described in greater detail at a subsequent point in the specification.

A dual modulation of the frequency of modulator 26 has previously been mentioned. This involves a second frequency variation in addition to that at 4140 cycles per second obtained through the operation of control 1 of oscillator 26, this second variation being produced by a component presently identified in FIG. 4 as control 2 of oscillator 26, and which comprises in a typical form a variable inductance whose properties are controlled by an input control current. Control of the current, and thereby the frequency variation produced by control 2, is obtained through a circuit tandem consisting of a cathode follower amplifier 72 connected to the input range rate signal terminal 63 and to a dual input amplifier 73. Dual input amplifier 73, despite its particular characterization, is primarily a feedback amplifier of high gain with a feedback signal being employed which is dependent upon the current through control 2 of oscillator 26 which is driven from 73 through current amplifier 74.

Output from oscillator 26 is taken through an output amplifier identified by reference character 75, the purpose of which is to provide the output frequency varied signal at a power level and impedance desired for subsequent circuitry and to serve as a buffer amplifier to avoid any frequency variation of the oscillator as a result of variations of the output loading.

Figure 5:
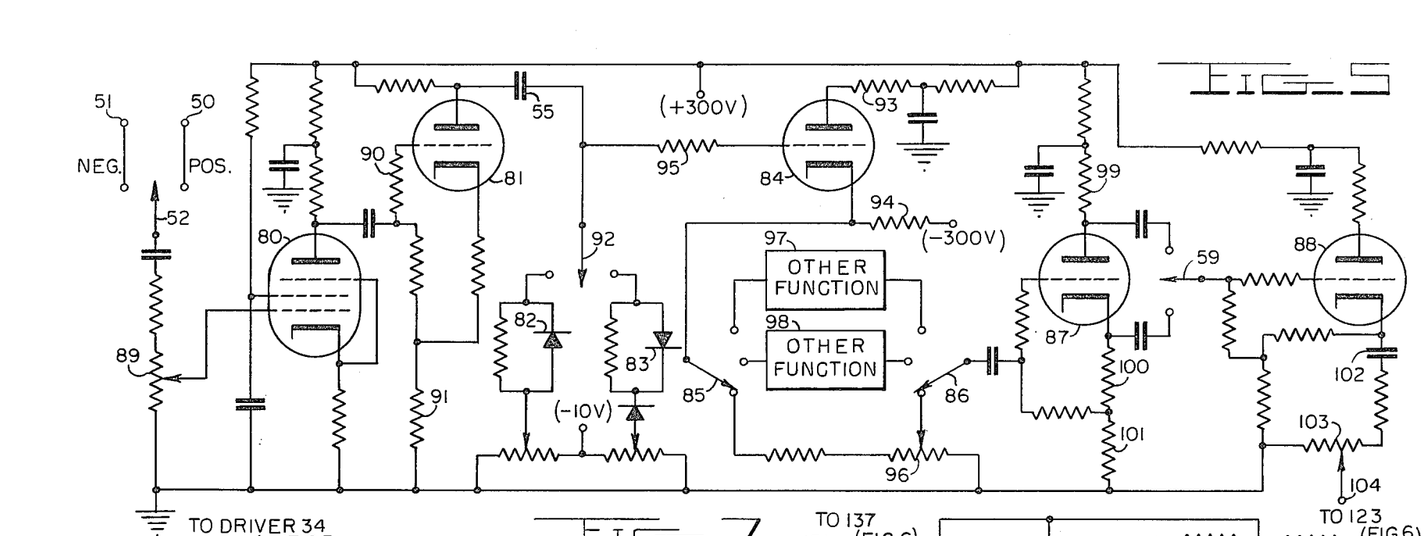
FIG. 5 shows schematic details of the "Function" distortion derivation components of FIG. 4.

With reference now to FIG. 5 of the drawings, typical schematic details of the portions of FIG. 4 from input terminals 50 and 51 through amplifier 60 are shown. For correspondence between the figures, the amplifier 52 of FIG. 4 is generally the circuitry associated with tubes 80 and 81. Capacitance 55 is indicated by the component of the same number in FIG. 5. Level restorer 56 is indicated by the circuitry associated with unilateral impedance devices 82 and 83. Cathode follower driver 54 is the circuitry associated with tube 84.

The distort control 57 corresponds to the circuitry associated with switches 85 and 86, while the inverter amplifier 58 corresponds to the circuitry of tube 87. The polarity selector 59 in general is indicated by the switch bearing the same reference character 59 in FIG. 5. Amplifier 60 corresponds in general to the circuitry associated with tube 88. In view of the preceding discussion, the operation of the circuitry of FIG. 5 is considered to be straightforward with the tube 80 being connected in the form of a high gain amplifier driven from an input circuit, including a signal amplitude selector potentiometer 89. Conventional forms of decoupling and filtering for the power supply to the anode and screen electrodes of tube 80 are used in this stage and it will be observed that similar examples of good practice are employed throughout the balance of the circuitry. The second amplifier stage of the apparatus of FIG. 1 associated with the tube 81 is again a straightforward amplifier circuit employing a parasitic suppressor resistor 90 connected to the grid and an additional cathode resistor 91 being employed to provide a form of internal feedback within the stage and to place the tube in a desirable region of its characteristics.

Precise control of the dc levels in the distort control components between switches 85 and 86 is required. To this end, a dc restorer circuit follows the coupling capacitance 55. By operation of switch 92 it is possible to select either plus or minus clamping of the grid of tube 84 as appropriate since correspondence with the polarity of the input signal selected by switch 51 is desired.

The amplifier stage of tube 84 is basically a cathode follower stage, the anode resistor 93 being of the order of 100 ohms inserted for parasitic suppression. Similarly, a series grid resistor 95 is shown being typically of the order of 100 ohms so as to have negligible effect on the input signals.

Switches 85 and 86 select the particular function distortion desired to match the acceleration characteristics of a distant target. For simplicity at this point, a simple form of distortion is shown in schematic detail as being merely a gain factor variation by potentiometer 96, which is in the circuit in the lowermost position of switches 85 and 86. With switches 85 and 86 operated to other indicated positions other function controls 97 and 98 can be selected which would have different acceleration matching characteristics. These controls can be nonlinear distortion producing devices which will be described in greater detail in connection with the distort control 64 of FIG. 4, which is shown in schematic detail in FIG. 6, or they can be merely different magnitude linear gain factor "distortion" produced by additional potentiometers such as 96.

The circuit of tube 87 is a well known form of inverter circuit in which the anode load resistance 99 is equal to the sum of the cathode resistances 100 and 101, so that equal amplitude but opposite polarity signals are produced at the anode and cathode of tube 87. The polarity selector 59 provides for the choice as to which of these signals is desired and, in general, this switch 59 will be manipulated in view of the settings of the previous switches and controls to achieve the desired signal shape at that point, which will result in the proper modulation of the frequency of the oscillator 26 of FIG. 4 to match object acceleration characteristics.

Switch 59 is connected to the grid of tube 88 which is in a cathode follower circuit with a dual cathode resistor arrangement which places tube 88 in a linear operating region for both positive and negative going applied signals. An output circuit including dc blocking and amplitude selection in the form of capacitance 102 and potentiometer 103 is provided so that the output signal is obtained at terminal 104 for delivery to terminal 123 of FIG. 6.

Figure 6:
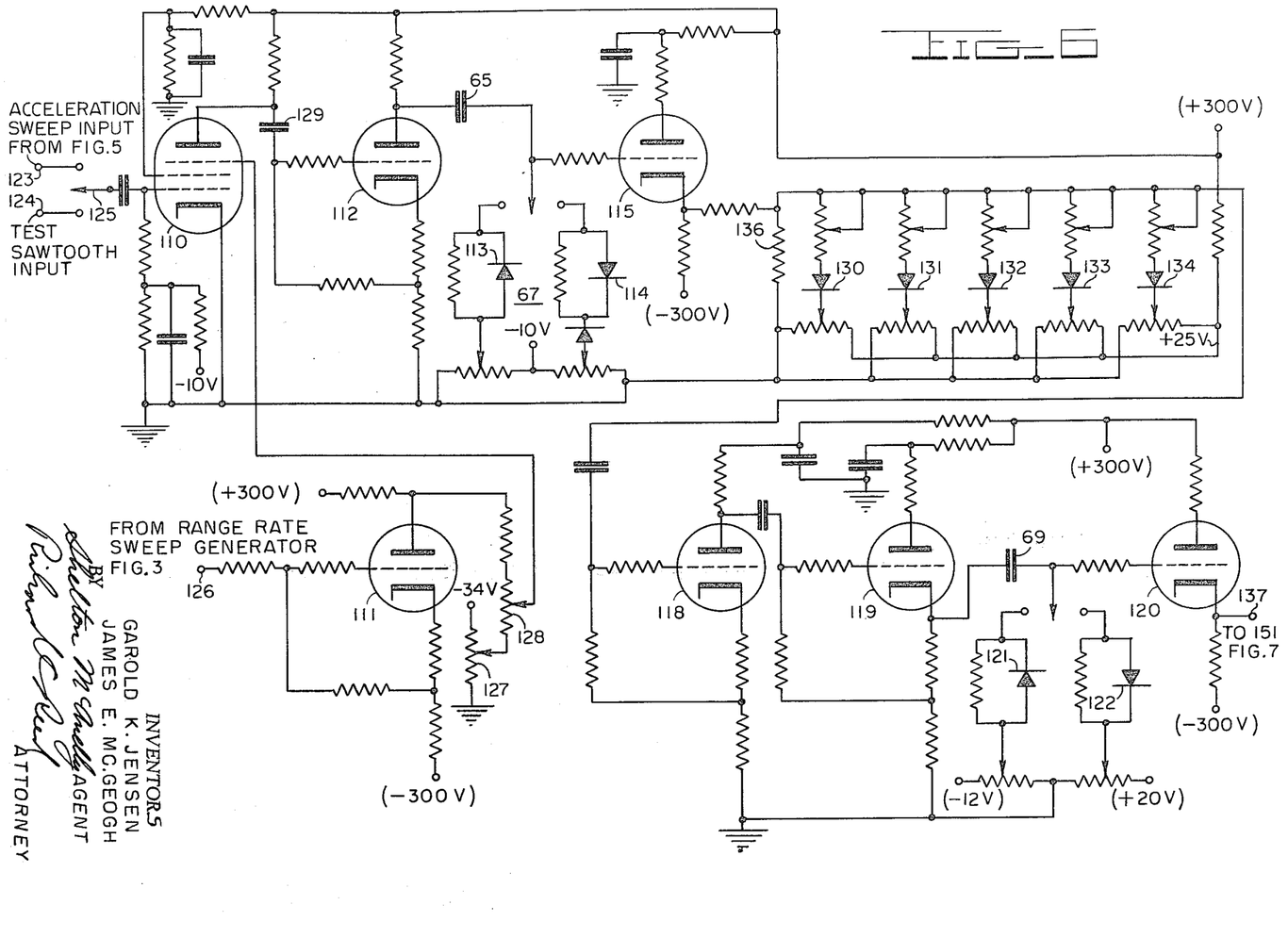
FIG. 6 shows schematic details of the "Oscillator" distortion derivation components of FIG. 4.

With reference now to FIG. 6 of the drawing, the apparatus shown therein corresponds to portions of FIG. 4 as follows: The principal component of the variable gain amplifier 61 is tube 110. The gain control 62 for tube 110 is circuitry associated with tube 111. The level restorer is the circuitry component associated with unilateral impedance elements 113 and 114, and the capacitance 65 is indicated by the same reference character in FIG. 6. Cathode follower driver 66 is the circuitry associated with electron tube 115. The distort control 64 is indicated as the circuitry between the cathode of tube 115 and the grid of tube 118, while the amplifier 68 is the circuitry associated with electron tubes 118 and 119. The similarity of the circuitry of tubes 110, 112, 115, 118, 119, to the previously described circuitry of FIG. 5 associated with tubes 80, 81, 84, 87, and 88 is quite evident, the primary difference being that in the circuit of FIG. 5, because of the higher frequencies involved, the time constants of the coupling circuits are less than those of FIG. 6. Additional differences reside in the provision of the gain control tube 111, the showing of a typical distortion network between the switches 116 and 117, the inclusion of the additional amplifier of tube 120 corresponding to cathode follower driver 70 of FIG. 4, the capacitance 69 and the level restorer of unilateral impedance elements 121 and 122 corresponding to the level restorer 71 of FIG. 4.

In describing the circuit of FIG. 6, it is observed that input terminal 123 is connected to terminal 104 of FIG. 5. In addition, another input terminal 124 is provided by means of which a reference sawtooth signal can be applied to the circuitry for checking the overall performance thereof with an input linear sawtooth signal such as that obtainable from the acceleration sweep generator 33 of FIG. 3. Switch 125 provides for selection of the input. Tube 110 is a pentode type tube receiving two input signals, one at the control grid from switch 125, the other at the suppressor grid from the circuit of tube 111. The grid of tube 111 is connected to the range rate sweep generator 35 of FIG. 3 at the input terminal 126. The connection of the anode of tube 112 to the suppressor grid of tube 110 is through several potentiometers 127 and 128 by means of which precise control of the dc potential of the suppressor grid, as well as the magnitude of the range rate sweep signal applied to the suppressor of tube 110, is possible.

The anode of tube 110 is coupled to the grid of tube 112 by capacitance 129. Tube 112 is in an anode loaded amplifier circuit and is coupled by a capacitance 65 in cooperation with the dc level restorer 67 having the unilateral impedance elements 113 and 114 to apply amplified signals to the grid of tube 115 with precise control of the dc level.

Tube 115 is in a cathode follower circuit with anode and grid parasitic suppressor resistors together with suitable plate supply decoupling. The cathode of tube 115 is connected to the particular distort network required to compensate for the characteristics of the solid state diode which exhibits variable capacitance properties. The distortion curve is obtained as a result of differential biasing voltages applied to diode unilateral impedance elements 130, 131, 132, 133, 134. Each of these unilateral impedance elements is in series with a variable resistance and is connected to an adjustable biasing point by means of which the level of the input signal at which each diode becomes conductive is readily adjustable. At the input to the diode distortion network is a voltage divider consisting of resistances 135 and 136 which provides the maximum slope to the output curve which is limited by the input linear sawtooth waves. Whenever the potential at the junction of resistances 135 and 136 exceeds the potential to which one of the diodes to 134 is connected, that diode becomes conductive to insert its associated variable resistance to change the effective voltage division action of the voltage divider. With the various unilateral impedance elements connected to different dc potentials across a voltage divider string, it is possible to change the level at which each diode becomes conductive and hence, produce a series of substantially linear approximations to the desired distortion curve.

The output of the diode distortion network is connected to the amplifier 118 which in turn is connected to amplifier 119, these being similar to amplifiers 87 and 88 of FIG. 5.

Figure 7:
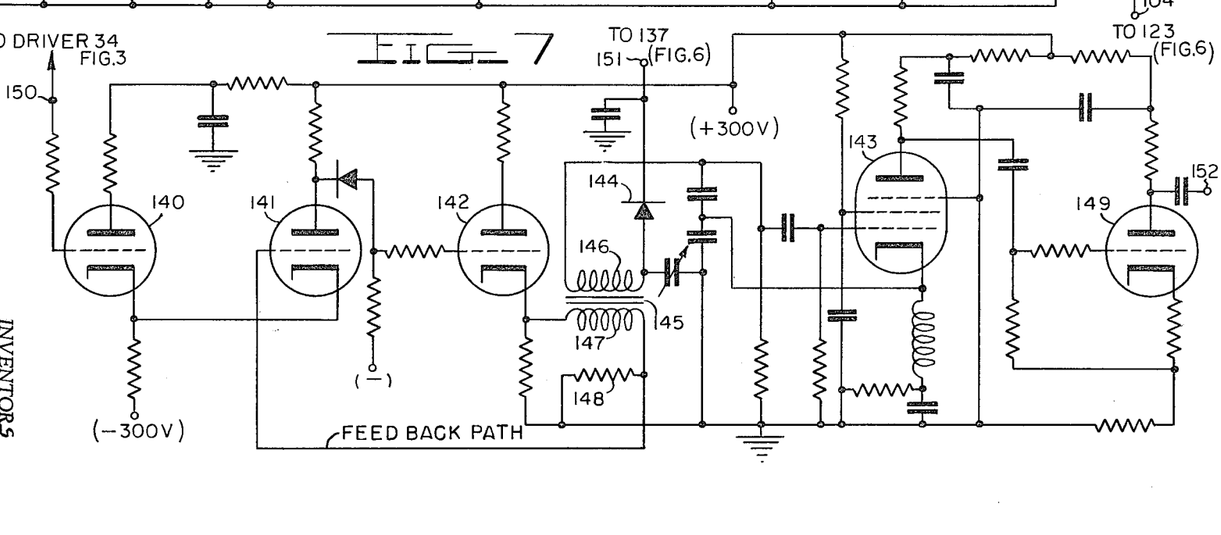
FIG. 7 shows schematic details of the oscillator and range rate sweep components of the apparatus of FIG. 4.

The action of the coupling capacitance 69, as well as the clamping or dc restoration circuit to the driver amplifier 120, are straightforward, requiring no particular elaboration, The cathode of the amplifier 120 is connected to an output terminal 137 leading to terminal 151 of FIG. 7 and thence to the semiconductor diode 144 which exhibits variable capacitance properties as control 1 of oscillator 26.

Attention is now directed to FIG. 7, which is related to previous circuitry in the following. Cathode follower amplifier 72 of FIG. 4 is represented by the circuitry associated with tube 140 and the dual input amplifier 73 is represented by the circuitry associated with tube 141. The current amplifier 74 of FIG. 4 is represented by the circuitry of tube 142.

The principal component of oscillator 26 of FIG. 4 is represented by the circuitry of tube 143 wherein control 1 is the diode 144 which exhibits capacitance variation properties. Typically, this particular diode is a type 1N950.

Control 2 of the oscillator 26 is represented by the variable reactor 145 having first winding 146 which is an inductive element of a tuned circuit, together with a second winding 147 which is a control winding to vary, in dependency on current flow therein, the inductance of the basic winding 146. The feedback previously referred to is obtained as a result of the voltage drop across resistance 148 which is effectively in series with the control winding 147. The feedback signal is applied through a suitable combining network to the grid of tube 141.

The output amplifier identified in FIG. 4 by the reference numeral 75 contains as its principal component the electron tube 149 which, as shown, is in a well designed circuit having anode decoupling, control grid parasitic suppression, and dual cathode resistances for the placement of the circuit in enhanced operating conditions.

The oscillator circuit of tube 143 is in a form of circuit identified as a "Clapp" circuit, having desired properties as to stability.

Obviously many modifications and variations of the present invention are possible in the light of the above teachings. It is therefore to be understood that within the scope of the appended claims the invention may be practiced otherwise than as specifically described.

What is claimed is:

1. A radar system comprising:
   transmitter means for emitting signals;
   receiver means for receiving echo signals of said emitted signals which have been reflected by distant objects and for providing output doppler signals related in frequency to the movement of distant objects;
   storage means connected to said receiver means for storing and grouping said receiver output signals in a manner related to predetermined ranges of distant objects and for playing back said range grouped stored signals in a predetermined sequence and with reduced time spacing therebetween;
   oscillator means for producing a signal which rapidly varies in frequency in a manner related to the expected movement of a distant object and varies in frequency at a slower rate to be related in sequence to different range rates of the distant object;
   heterodyning means connected to said storage means and to said oscillator means
   whereby substantially constant frequency heterodyning means output signals are derived when said oscillator means frequency variations match the frequency variations in said doppler signals.

2. The radar system set forth in claim 1 wherein the frequency of said oscillator means is controlled by a voltage driven variable capacitor included within said oscillator means.

3. The radar system set forth in claim 2 and further comprising:
  voltage source means for driving said oscillator means and
  distortion circuit means including non-linear impedances connected to said voltage source means and to said oscillator means for distorting the voltage from said source so that the frequency of said oscillator varies in said manner related to the expected movement of a distant object.

4. The radar system set forth in claim 3 and further including narrow bandwidth filter means connected to said heterodyning means for improving the signal-to-noise ratio in said heterodyning means output signals by rejecting off-frequency noise.

* * * * *